(12) United States Patent
Klemets et al.

(10) Patent No.: US 10,834,185 B2
(45) Date of Patent: *Nov. 10, 2020

(54) ACTIVATING A PEER-TO-PEER COMMUNICATION CHANNEL

(71) Applicant: Microsoft Technology Licensing, LLC, Redmond, WA (US)

(72) Inventors: Anders Edgar Klemets, Redmond, WA (US); Cristian Matesan, Redmond, WA (US); Rouella Mendonca, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,371

(22) Filed: Feb. 26, 2019

(65) Prior Publication Data

US 2019/0199791 A1 Jun. 27, 2019

Related U.S. Application Data

(63) Continuation of application No. 15/431,095, filed on Feb. 13, 2017, now Pat. No. 10,270,851.

(51) Int. Cl.
*H04L 29/08* (2006.01)
*H04W 76/14* (2018.01)
(Continued)

(52) U.S. Cl.
CPC .......... *H04L 67/1068* (2013.01); *H04L 12/12* (2013.01); *H04L 67/141* (2013.01);
(Continued)

(58) Field of Classification Search
CPC ... H04L 67/10; H04L 67/104; H04L 67/1061; H04L 67/1068; H04W 76/14; H04W 52/0209; H04W 52/0212
See application file for complete search history.

(56) References Cited

U.S. PATENT DOCUMENTS 8,086,886 B2 * 12/2011 Schmidt ................ G06F 1/3209
713/323
9,001,693 B2 4/2015 Abraham et al.
(Continued)

OTHER PUBLICATIONS

"Aug. 2014 Update Rollup for Windows RT 8.1, Windows 8.1, and Windows Server 2012 R2", Retrieved From: https://support.microsoft.com/en-in/kb/2975719, Retrieved on: Jul. 11, 2016, 15 Pages.
(Continued)

*Primary Examiner* — Robert C Scheibel
(74) *Attorney, Agent, or Firm* — Klarquist Sparkman, LLP

(57) ABSTRACT

Technology related to activating a first communication channel is disclosed. In one example of the disclosed technology, operations can be performed for initiating communications with a remote computing device over a first communication channel. The operations can comprise determining an address associated with a second communication channel of the remote computing device, transmitting a network packet addressed to the remote computing device over the second communication channel for causing the remote computing device to begin a sequence to activate the first communication channel, and initiating communication over the first communication channel with the remote computing device at a different address associated with the first communication channel.

22 Claims, 9 Drawing Sheets

(51) Int. Cl.
*H04W 8/00* (2009.01)
*H04W 52/02* (2009.01)
*H04L 12/12* (2006.01)
*H04L 29/06* (2006.01)
*H04W 84/12* (2009.01)

(52) U.S. Cl.
CPC ............. *H04L 69/14* (2013.01); *H04W 8/005* (2013.01); *H04W 52/0212* (2013.01); *H04W 76/14* (2018.02); *H04W 84/12* (2013.01); *Y02D 70/00* (2018.01); *Y02D 70/10* (2018.01); *Y02D 70/14* (2018.01); *Y02D 70/142* (2018.01); *Y02D 70/144* (2018.01); *Y02D 70/146* (2018.01); *Y02D 70/20* (2018.01); *Y02D 70/22* (2018.01)

(56) References Cited

U.S. PATENT DOCUMENTS

| | | | | |
|---|---|---|---|---|
| 2006/0075269 | A1* | 4/2006 | Liong | H04L 12/12 713/300 |
| 2011/0122835 | A1* | 5/2011 | Naito | H04W 76/15 370/329 |
| 2011/0261907 | A1 | 10/2011 | Lee et al. | |
| 2012/0208462 | A1* | 8/2012 | Lee | H04W 8/005 455/41.2 |
| 2012/0324516 | A1 | 12/2012 | Gold-gavriely | |
| 2013/0113710 | A1 | 5/2013 | Choi et al. | |
| 2013/0331028 | A1 | 12/2013 | Kuehnel et al. | |
| 2014/0334364 | A1* | 11/2014 | Liu | H04W 52/0206 370/311 |
| 2014/0373123 | A1 | 12/2014 | Kang | |
| 2015/0036673 | A1 | 2/2015 | Asterjadhi et al. | |
| 2015/0050039 | A1 | 2/2015 | Kang | |
| 2015/0172905 | A1* | 6/2015 | Qi | H04L 67/1061 370/338 |
| 2015/0257166 | A1* | 9/2015 | Weizman | H04W 40/12 455/452.2 |
| 2016/0088550 | A1 | 3/2016 | Rabii et al. | |
| 2016/0219423 | A1* | 7/2016 | Lee | H04W 8/005 |
| 2016/0249315 | A1* | 8/2016 | Venkatraman | H04W 24/08 |
| 2016/0308896 | A1* | 10/2016 | Kim | H04L 63/14 |
| 2018/0035363 | A1* | 2/2018 | Gupta | H01L 21/76885 |
| 2018/0122130 | A1* | 5/2018 | Kim | G06F 3/0485 |

OTHER PUBLICATIONS

Branscombe, Mary, "A Glimpse of the Future: What we Can Expect From Windows 10 PCs", Retrieved From: http://www.in.techradar.com/news/computing/pc/A-glimpse-of-the-future-what-we-can-expect-from-Windows-10-PCs/articleshow/46484453.cms, Mar. 7, 2015, 10 Pages.

* cited by examiner

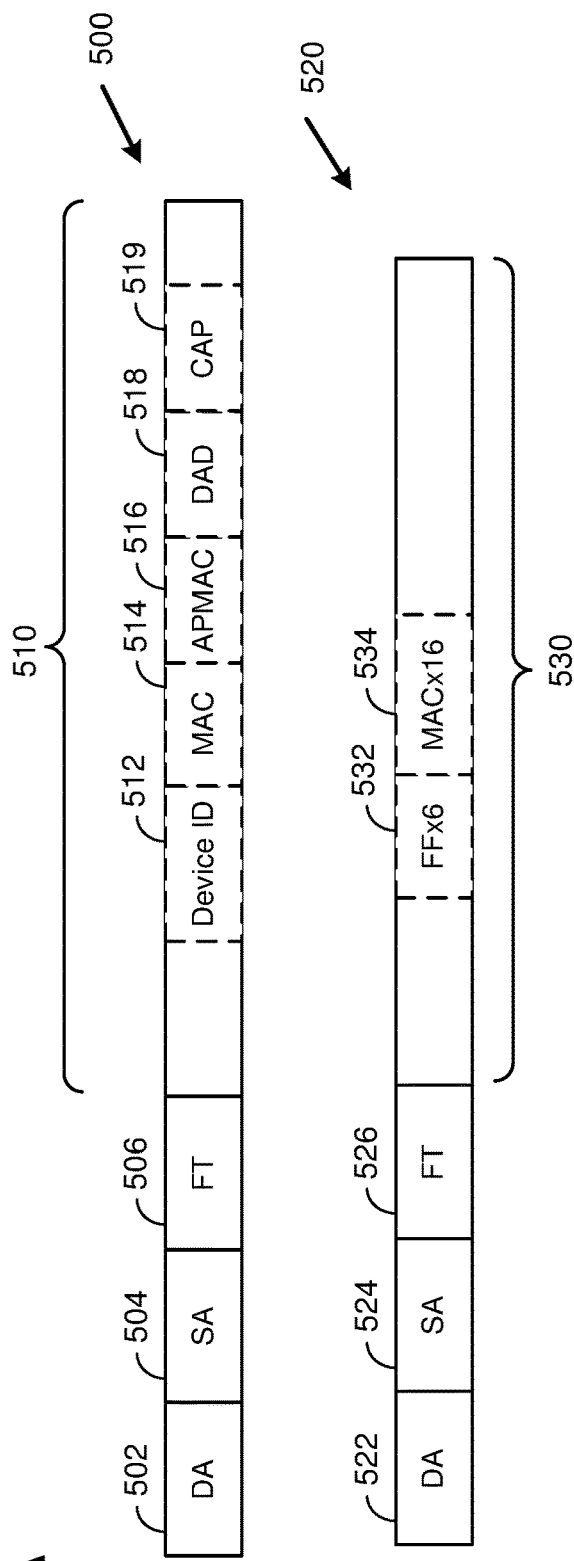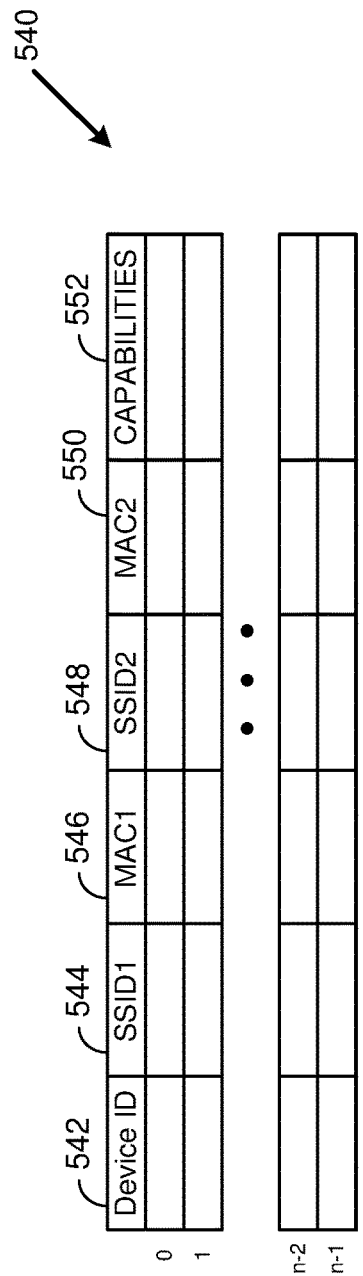
FIG. 5A
FIG. 5B

ACTIVATING A PEER-TO-PEER COMMUNICATION CHANNEL

CROSS REFERENCE TO RELATED APPLICATIONS

This application is a continuation of U.S. patent application Ser. No. 15/431,095, filed Feb. 13, 2017, and now U.S. Pat. No. 10,270,851, which is hereby incorporated by reference.

BACKGROUND

Electronic devices can be designed to share information by communicating wirelessly with each other. The wireless spectrum has a limited channel capacity and so the electronic devices may be limited in the types and the amount of the information that can be transmitted between the electronic devices. Additionally, it can be desirable to reduce the power of electronic devices. As one example, portable electronics may operate on batteries and reducing the power consumption of a portable electronic device can extend the battery life of the device giving a user of the device more time to use the device between charges.

SUMMARY

Technology related to activating a first communication channel is disclosed. In one example of the disclosed technology, operations can be performed for initiating communications with a remote computing device over a first communication channel. The operations can comprise determining an address associated with a second communication channel of the remote computing device, where determining the address associated with the second communication channel of the remote computing device comprises obtaining a cached device identifier associated with the remote computing device, and where the device identifier associated with the remote computing device was cached during an earlier connection over the first communication channel. The operations can also comprise transmitting a network packet addressed to the remote computing device over the second communication channel for causing the remote computing device to begin a sequence to activate the first communication channel. The operations can also comprise initiating communication over the first communication channel with the remote computing device at a different address associated with the first communication channel. In some implementations, identifying the remote computing device can comprise identifying a device identifier associated with the second communication channel and the first communication channel. For example, the device identifier can be received in response to forming a connection with the remote computing device over the first communication channel.

BRIEF DESCRIPTION OF THE DRAWINGS

FIG. 5A illustrates examples of a magic packet and a response packet including an information element in a payload of the response packet.

FIG. 5B illustrates an example of a connection data structure.

DETAILED DESCRIPTION

General Considerations

Figure 1:
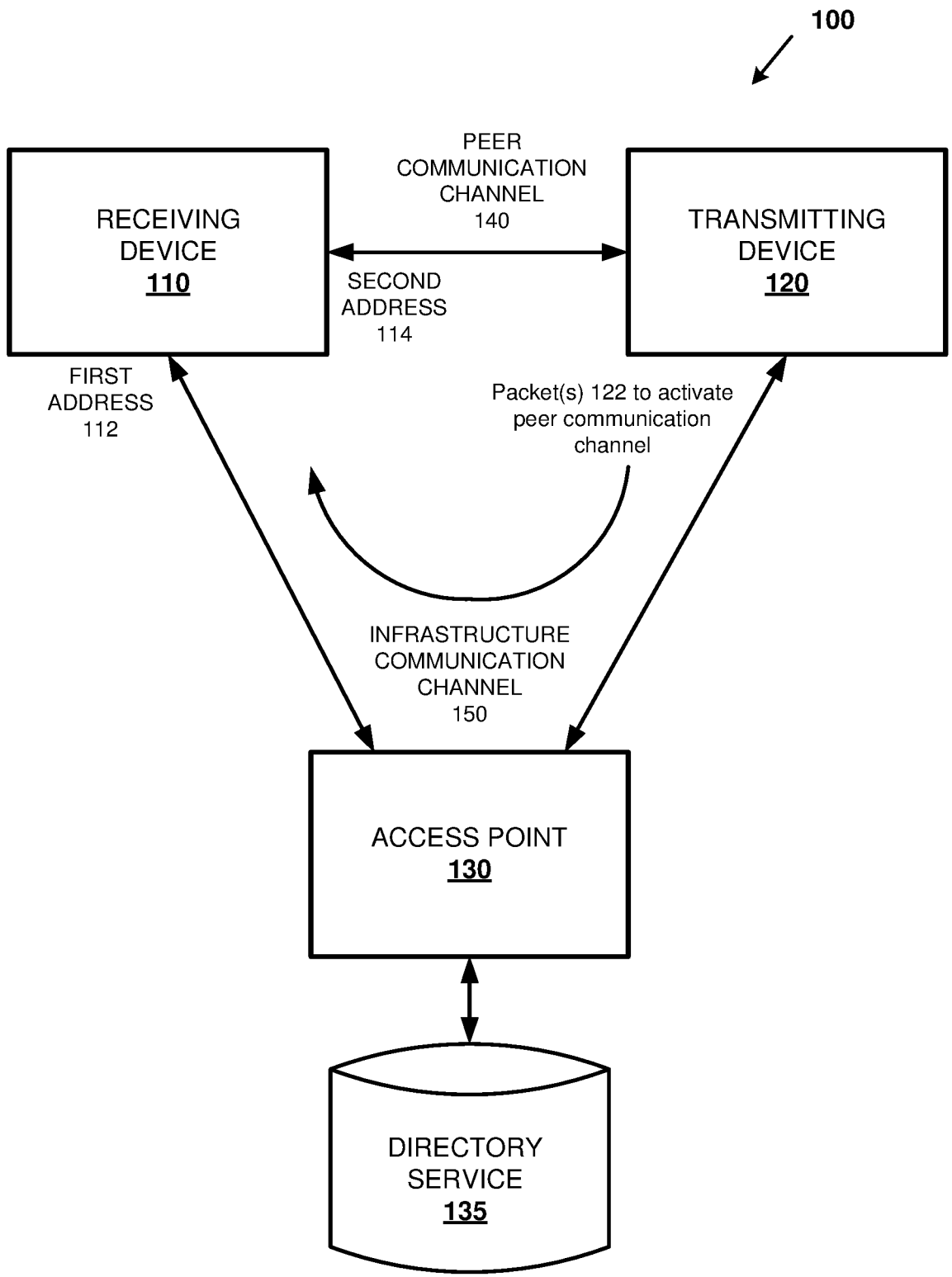
FIG. 1 is a system diagram of an example system including an infrastructure communication channel and a peer communication channel.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods.

Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Overview

When an electronic device, such as a personal computer (PC), set-top box, or game console is idle for a given period of time, the electronic device can transition to a lower power mode (e.g., a standby mode) to conserve energy. In the lower-power mode, hardware and software can be adjusted to place the electronic device into a state that uses less energy than during a fully-operational state. For example, power can be removed or gated from portions of the hardware, clocks can be gated, and software functions can be terminated or placed in a suspend mode. However, some portions of the electronic device can remain active so that the device can detect a condition to transition to a higher-power state and so that the transition can occur. For example, a PC in a standby mode can transition to a fully-operational state (e.g., the PC can wake up) when a key of the keyboard is pressed, when movement of a mouse is detected, or when a magic packet is received on an active communication channel A magic packet is a network packet that is encoded to transition an electronic device from a lower-power state to a higher-power state. For example, a magic packet can be a wake-on-LAN (WOL) Ethernet packet or a wake-on-wireless-LAN (WOWLAN) Wi-Fi packet.

Wi-Fi® (also known as IEEE 802.11) is a wireless communication standard that allows different electronic devices to wirelessly communicate over a wireless local area network (LAN) using a wireless access point (also known as a base station). The devices connected to the wireless access point can be called stations, end-nodes, or clients. The wireless access point can provide radio frequency links or channels to the wireless LAN. The wireless access point can manage access (e.g., authenticate, add, and remove devices) to the wireless LAN, bridge and/or route between different devices connected to the wireless LAN, and provide a link to one or more wired networks (e.g., using Ethernet). Using traditional or infrastructure Wi-Fi, devices connected to the wireless LAN communicate with each other through the wireless access point. Specifically, a message sent from one client to another client is transmitted twice: once from the transmitting client to the wireless access point and once from the wireless access point to the receiving client. Thus, using the wireless access point as an intermediary can be an inefficient use of the wireless spectrum's channel capacity.

Wi-Fi Direct® is an extension of the Wi-Fi wireless communication standard that allows different electronic devices to communicate directly with each other without using a wireless access point as an intermediary. Thus, when two devices are connected using Wi-Fi Direct, a message from one device to another device can use half of the bandwidth of infrastructure Wi-Fi since the message is communicated directly between the devices without passing through the wireless access point. Additional standards, such as Miracast™, can be layered on top of Wi-Fi Direct. For example, a Miracast packet can be encapsulated within a Wi-Fi Direct packet so that a Miracast-enabled device can communicate using the Wi-Fi Direct standard.

Wi-Fi Direct- and/or Miracast-capable devices can detect the presence of each other by performing a discovery protocol. As one example, a Miracast receiver device can periodically transmit a beacon over Wi-Fi to advertise its presence, address, and capabilities. A Miracast transmitter can receive and decode the beacon to detect the presence, address, and capabilities of the Miracast receiver. However, the beacons can be sent infrequently by the receiver device and so the transmitter device can also initiate discovery to potentially increase the speed for the devices to discover each other as compared to when only beacons are used. For example, the transmitting device can broadcast a probe request advertising its presence and capabilities. The receiving device can receive the probe request and respond by sending a probe response advertising its presence and capabilities. Once the devices are aware of each other's presence and capabilities, additional handshaking can occur to determine the characteristics of a peer communication channel between the devices. As one example, the devices can negotiate which of the devices will act as a peer-to-peer group owner so that only one of the devices will send beacon packets.

When the Miracast receiver detects that a Miracast transmitter is within physical proximity of the Miracast receiver and the characteristics of a potential peer communication channel are known, the Miracast receiver can request that a communication connection be formed between the Miracast receiver and the Miracast transmitter. As a specific example, a PC in a conference room can be a Miracast receiver and a mobile phone can be a Miracast transmitter. A user of the mobile phone in the conference room can discover that the PC is a Miracast receiver and the user can cause the screen of the mobile phone to be displayed on a display of the PC using a Miracast transmitter application.

In some scenarios, supporting both infrastructure Wi-Fi and Wi-Fi Direct can increase power consumption and reduce the amount of information that can be transmitted between devices. For example, the Miracast beacons sent over Wi-Fi Direct can be time-multiplexed with the infrastructure Wi-Fi signals, reducing the bandwidth available for infrastructure Wi-Fi. If there are no active Miracast-capable transmitters in physical proximity with the Miracast-capable receiver, then the beacon is using energy and bandwidth that may be better used for infrastructure Wi-Fi communications. Thus, an electronic device can disable Wi-Fi Direct to potentially save energy and improve the communications capacity for infrastructure Wi-Fi. For example, a Miracast receiver application can include a time-out feature where Wi-Fi Direct functionality is disabled (such as by suspending beacon packets or by terminating a Miracast application) when a Miracast transmitter has not been detected within a given amount of time.

When a device having Miracast receiver functionality is in a low-power state (e.g., standby) or when the Miracast receiver functionality has been disabled, a Miracast transmitter cannot discover the Miracast receiver and cannot communicate over Wi-Fi Direct with the Miracast receiver. Specifically, since the Miracast receiver will not participate in the discovery protocol (e.g., will not send beacon packets), the Miracast transmitter cannot detect the presence or address of the Miracast receiver. Additionally, the Miracast transmitter cannot cache the address of the Miracast receiver during an earlier connection, because the operating system (OS) can assign different addresses to the Miracast receiver each time the Miracast receiver is started.

As described herein, Miracast and other peer-to-peer communications can be initiated between a transmitting device and a receiving device over an inactive peer communication channel (e.g., Miracast over Wi-Fi Direct). The method can include determining an address associated with an infrastructure communication channel (e.g., infrastructure Wi-Fi) of the receiving device. One or more packets (such as a magic packet and/or a packet including a remote launch command) addressed to the receiving device can be transmitted over the infrastructure communication channel to cause the receiving device to begin a sequence to activate the peer communication channel Activating the peer communication channel can include transitioning the receiving device from a lower power state to a higher power state and starting peer receiver functionality (e.g., starting a Miracast receiver application). The peer receiver functionality can cause a beacon packet to be transmitted, where the beacon packet includes an address of the peer receiver. Communication can be initiated over the peer communication channel from the transmitting device to the receiving device at the address of the peer receiver over the peer communication channel. Thus, the peer receiver device can be placed in a lower power state and communication bandwidth can be conserved for the infrastructure communication channel when the peer communication channel is not being used, and the peer receiver functionality can be restarted when a peer transmitter is present. It should be noted that as used herein, a peer communication channel can also be referred to as a peer-to-peer communication channel.

Example System Architectures

FIG. 1 illustrates an example system 100 including a receiving device 110, a transmitting device 120, and an access point 130. As a specific example, the receiving device 110 can be a personal computer, a game console, or a set top box that can execute a peer receiver application, such as a Miracast receiver application. The transmitting device 120 can be a laptop computer or a mobile phone executing a peer transmitter application, such as a Miracast transmitter application, for example. The access point 130 can be a wireless access point or an Ethernet bridge or router, for example.

Initially, a peer communication channel 140 can be inactive and the receiving device 110 and the transmitting device 120 can communicate via the access point 130 over an infrastructure communication channel 150, such as infrastructure Wi-Fi. In particular, the receiving device 110 can have a first address 112 that is associated with the infrastructure communication channel 150, and the transmitting device 120 can communicate with the receiving device 110 by sending packets addressed to the receiving device 110 over the infrastructure communication channel 150. For example, the first address 112 can be a link layer or Media Access Control (MAC) address. Generally, a given device communicating over a given communication channel can have multiple addresses, where different addresses can correspond to different layers of the Open Systems Interconnection (OSI) model.

The OSI model standardizes and partitions the internal functions of a communication system into abstraction layers. In particular, the OSI model standardizes and partitions a communication system into seven layers. A particular layer provides a communication path with the layers adjacent (e.g., a layer above and a layer below) to the particular layer. The lowest layer is the physical layer (referred to as layer 1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (referred to as layer 2). The link layer defines the protocols for transferring data between two nodes. Additionally, the link layer can define protocols for establishing and terminating connections between nodes, managing flow control, and detecting and/or correcting errors occurring on the physical layer. Examples of link layer protocols are Ethernet, Wi-Fi, Wi-Fi Direct, Asynchronous Transfer Mode (ATM), Point-to-Point Protocol (PPP), High-level Data Link Control (HDLC), Fiber Distributed Data Interface (FDDI), and Token Ring. The link layer can provide a communication path with the network layer (referred to as layer 3). Examples of network layer protocols are Internet Protocol (IP) (including IPv4 and IPv6), ICMP, Address Resolution Protocol (ARP), Internetwork Packet Exchange (IPX), and Datagram Delivery Protocol (DDP). Other layers of the OSI model include the transport layer (layer 4), the session layer (layer 5), the presentation layer (layer 6), and the application layer (layer 7). It should be noted that a network packet (or simply a packet) generally includes a header used to address the packet to a remote node or agent at the layer of the packet and a payload having a discrete quantity of information. A packet addressing an agent at one layer can be encapsulated within a payload of a packet at a lower layer as the original packet transits the communication layers. A packet of the link layer can also be referred to as a frame. The OSI model is a reference and some networking protocols may not strictly adhere to the seven layers of the OSI model. For example, in some embodiments, the functions of the link layer and the physical layer may be blended into a single link layer. The combination of protocols used at the different layers of the OSI model can be referred to as a protocol stack. For example, one particular protocol stack may include an IP layer and an Ethernet layer. As another example, a protocol stack may include a Miracast layer and a Wi-Fi or Wi-Fi Direct layer.

A communication channel is a logical pathway for communications to transit between two or more electronic devices. For example, a given communication channel can correspond to a particular physical transmission medium (such as an electrical wire, an optical cable, or a range of frequencies), a particular communications protocol (such as Ethernet, Wi-Fi, or Wi-Fi direct), and a particular encoding scheme (such as a particular time period within a time division multiplexed signal or a signal encrypted using a particular key). As a specific example, each of the following can be different communication channels: an Ethernet connection, a first Wi-Fi connection using a first encryption key, a second Wi-Fi connection using a second encryption key, and a Wi-Fi Direct connection. A communication channel is used to transfer information. A communication channel's capacity for transmitting information can be measured by its data rate or bandwidth. However, a theoretical capacity for a given communication channel can potentially be reduced due to interference from different communication channels. Thus, a given communication channel's transfer rate can potentially be increased by disabling another communication channel.

The transmitting device 120 can be capable of transmitting information directly to the receiving device 110 via the peer communication channel 140. The receiving device 110 and the transmitting device 120 can be made aware of each other's presence using a discovery protocol. Generally, a discovery protocol is used for a group of devices to advertise and receive information about each other and to negotiate properties of any shared communication channels that can potentially connect the devices. A discovery protocol can specify packet types and formats for advertising information and one or more sequences for sharing information between the devices and/or negotiating properties of a communication channel for connecting the devices. As one example, a discovery protocol can specify a beacon packet for advertising properties of a device and/or channel. As another example, a discovery protocol can specify a series of probe and response packets to enable devices to receive information about each other and to negotiate the characteristics of a communication channel connecting the devices. As a specific example of discovery, the receiving device 110 can transmit (e.g., broadcast) a beacon packet advertising properties of the receiving device 110 and/or of the peer communication channel 140. The transmitting device 120 can listen for beacon packets to determine whether there are proximate devices that are capable of communication over a peer channel. In particular, the transmitting device 120 can listen for a beacon packet from the receiving device 110 to determine the presence of the receiving device 110 and to determine capabilities of the peer communication channel 140. When the beacon packet is detected, the transmitting device 120 can request a connection to the receiving device 110 over the peer communication channel 140. However, when the beacon packet is not transmitted, such as when the receiving device 110 is in a low-power mode or when the peer receiving functionality is disabled, the transmitting device 120 cannot form a connection to the receiving device 110 over the peer communication channel 140.

If the transmitting device 120 can discover that the receiving device 110 can be reached over the infrastructure communication channel 150, the transmitting device 120 can send one or more packets 122 to activate the peer communication channel 140. As one example, the transmitting device 120 can discover that the receiving device 110 can form a peer-to-peer connection by accessing a directory service 135. The directory service 135 can store a data structure indicating which devices currently or previously connected to the access point 130 can potentially form a peer-to-peer connection with other devices. For example, the directory service can be updated by the receiving device 110. Specifically, the receiving device 110 can send a message to the directory service 135 indicating that the receiving device 110 can form peer-to-peer connections. Prior to attempting a peer-to-peer connection, the transmitting device 120 can access the directory service 135 to determine whether any devices connected to the access point 130 can form peer-to-peer connections. As another example, the transmitting device 120 can store a data structure that remembers the devices that were previously connected using peer-to-peer connections.

As one example, the particular packet(s) 122 sent to activate the peer communication channel 140 can vary based on a state of the receiving device 110. In particular, when the receiving device 110 cannot be detected by the transmitting device 120, the transmitting device 120 can send one or more magic packets to the receiving device 110 over the infrastructure communication channel 150. Each of the magic packets can be encoded to include multiple repetitions of the first address 112. The transmitting device 120 can wait several seconds for the receiving device 110 to potentially transition to a higher power state. When the receiving device 110 can be detected by the transmitting device over the infrastructure communication channel 150, the transmitting device 120 can send a packet including a remote launch command for starting a peer receiver application. When the peer receiver application is started, the receiving device 110 can start a process that enables the receiving device 110 to participate in a discovery process. For example, the receiving device 110 can begin to transmit beacon frames when the receiver application is started so that a peer communication channel 140 can be formed. Specifically, an operating system of the receiving device 110 can assign a second address 114 to the receiving device 110 associated with the peer communication channel 140. The transmitting device 120 can detect the beacon frame and can decode the second address 114 so that a connection request can be transmitted from the transmitting device 120 the receiving device 110 at the second address 114 over the peer communication channel 140. The receiving device 110 and the transmitting device 120 can complete the handshake to form the peer-to-peer connection over the peer communication channel

140. Thus, a peer-to-peer connection to the receiving device 110 having a second address 114 can be formed by sending a packet to the receiving device 110 over a different channel at a different address (e.g., the first address 112).

Figure 2:
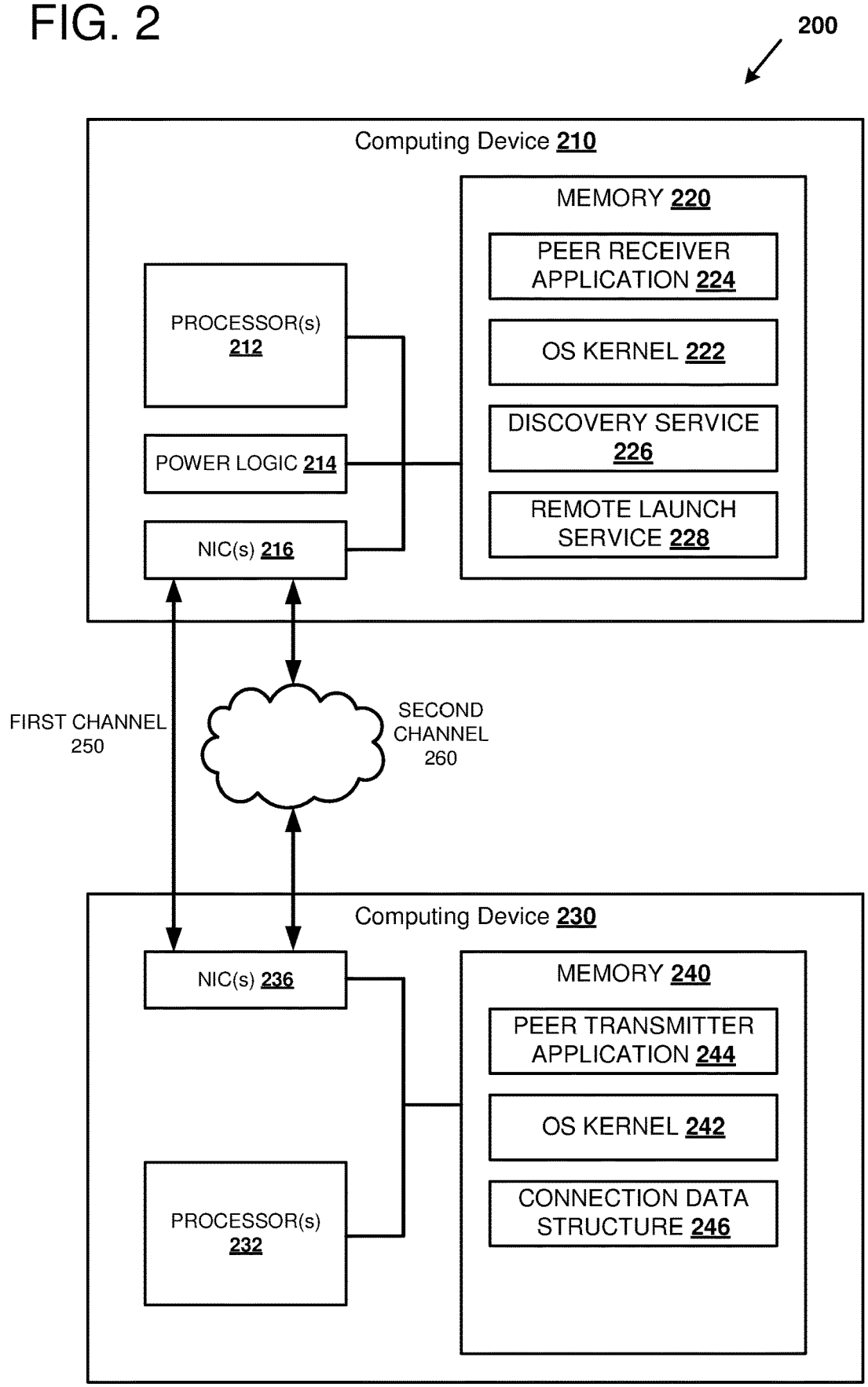
FIG. 2 is a system diagram illustrating components of computing devices that can communicate over a first communication channel and a second communication channel.

FIG. 2 illustrates a system 200 and various components of computing devices 210 and 230 that can be used to communicate over a first communication channel 250 and a second communication channel 260. For example, the first channel 250 can be a dedicated communication channel for peer-to-peer communications between the computing device 210 and the computing device 230, such as a Wi-Fi Direct channel. The second channel 260 can be an infrastructure communication channel, such as infrastructure Wi-Fi, Ethernet, or Bluetooth, for example. The infrastructure communication channel can include additional network devices such as a wireless access point and/or a bridge, hub, or a router. The different communication channels 250 and 260 can be active at different times. As one example, the second channel 260 can be active when either of the computing devices 210 and 230 are powered on and the first channel 250 can be active only while both of the computing devices 210 and 230 select to maintain the channel.

The computing device 210 can be configured as a receiving device. The computing device 210 can include one or more processors 212, power control logic 214, one or more network interface controllers (NICs) 216, and memory 220. The processor(s) 212 can execute instructions that are loaded in the memory 220 and can communicate with the power control logic 214 and the NIC(s) 216. Software can be used to configure the computing device 210 as a receiving device. For example, the memory 220 can be loaded with an operating system kernel 222, a peer receiver application 224, a discovery service 226, and a remote launch service 228. In one embodiment, the peer receiver application 224, the discovery service 226, and/or the remote launch service 228 can be integrated into an operating system of the computing device 210.

The computing device 210 can operate in different power modes or states. For example, the computing device 210 can be completely powered off (the lowest power state); the computing device 210 can be completely powered on where all components of the computing device are powered on (the highest power state); the computing device 210 can be in a standby power mode, where at least one of the components is powered down and at least one of the components is powered up. There can be multiple standby power modes, where higher power standby modes use more energy due to more or higher power components being powered on, and lower power standby modes use less energy due to fewer or lower power components being powered on. One or more of the lower power standby modes can be referred to as a sleep mode. In contrast, one or more higher power modes, such as the completely powered on state can be referred to as an awake mode. The power control logic 214 can monitor activity occurring on the computing device 210 and in conjunction with the operating system can power down and power up various components of the computing device 210. For example, the power control logic 214 can monitor processor utilization and can power up and power down individual cores of a multicore processor(s) 212 based on the detected utilization. The power control logic 214 can monitor peripheral functions (such as networking peripherals, display peripherals, and so forth) of the computing device 210 and can power up or power down the peripheral functions. The power control logic 214 can monitor input devices (such as a keyboard or mouse) to detect activity that can be used to trigger a transition to a higher power state.

The NIC(s) 216 include computer hardware and software for connecting the computing device 210 to the first communication channel 250 and the second communication channel 260. In particular, the NIC(s) 216 include suitable electronic circuitry to communicate using a particular physical and link layer. For example, the NIC(s) 216 can be used to communicate over the communication channels 250 and 260 using Ethernet, Wi-Fi, Wi-Fi Direct, and/or other link layer protocols. The NIC(s) 216 can provide a separate interface for each communication protocol that is supported by the NIC(s) 216. Each interface of the NIC(s) 216 can include a separate link layer address, such as a MAC address. Thus, a first MAC address can be assigned to the first channel 250 and a second MAC address can be assigned to the second channel 260. The NIC(s) 216 can operate in standby mode where packets are received by the NIC(s) 216 over the second channel 260 and at least some processing is performed on the received packets. Specifically, the NIC(s) 216 can decode and identify magic packets that are received over the second channel 260 when the computing device 210 and/or the NIC(s) 216 are in standby mode. The NIC(s) 216 can signal other components of the computing device 210, such as the power logic 214, when a magic packet is identified, so that the computing device 210 can be transitioned to a higher power state.

The operating system kernel 222 can include different software routines, modules, or components for managing different aspects of the execution of programs and for interfacing with the hardware of the computing device 210. For example, the operating system kernel 222 can manage the loading and removal of different programs into the memory 220; the operating system kernel 222, in conjunction with the power logic 214, can manage the power states of the computing device 210; the operating system kernel 222 can provide an interface for applications to send and receive network packets using the NIC(s) 216 over the communication channels 250 and 260; and the operating system kernel 222 can enable inter-process communication between the different applications. The operating system kernel 222 can include security features such as locking the computing device 210 when the computing device 210 is idle or upon a user command to lock the computing device 210. The computing device 210 can be referred to as "under lock" when the computing device 210 is locked. The operating system kernel 222 can maintain settings that control which functions or programs can be accessed when the computing device 210 is locked. For example, one setting can allow an application to be started "under lock" and another setting can prevent an application from being started under lock. Thus, the settings of the operating system kernel 222 can be used to allow some applications to run under lock and some applications can be prevented from running under lock.

The peer receiver application 224 can include different software routines, modules, or components for managing a peer-to-peer connection with a transmitter application on a different computing device, such as the peer transmitter application 244 of the computing device 230. For example, the peer receiver application 224 can generate packets for transmission over the communication channels 250 and 260 and can communicate the packets to the NIC(s) 216 either directly or by using the operating system kernel 222; and the peer receiver application 224 can receive packets from the NIC(s) 216 that are transmitted over the communication channels 250 and 260. The packets generated by the peer receiver application 224 can be encoded to advertise the receiver's capabilities during a peer-to-peer communication session (such as during discovery) and to maintain a peer-to-peer communication session. Packets received by the peer receiver application 224 over the channel 250 can be decoded to render an image and/or sound that can be displayed or output on an output device (such as a display monitor and/or speaker) of or connected to the computing device 210. As a specific example, the peer receiver application 224 can be a Miracast receiver application that can be used to display a screen of a remote device on a screen of or connected to the computing device 210. Additionally, probe request and/or response packets can be received and processed by the peer receiver application 224 during discovery in accordance with the discovery protocol. The peer receiver application 224 can generate probe request and/or response packets in response to received packets during discovery.

The discovery service 226 can include different software routines, modules, or components for advertising capabilities of the computing device 210. For example, the discovery service 226 can indicate any programs that can be launched remotely, conditions for remotely launching a program (such as whether the program can be launched under lock), and/or whether the computing device 210 supports magic packets, and so forth. As a specific example, the discovery service 226 can advertise that the peer receiver application 224 can be remotely launched and that the computing device 210 supports magic packets over infrastructure Wi-Fi (e.g., wake over wireless LAN packets). The discovery service 226 can be push-based or pull-based. For example, a push-based discovery service 226 can transmit capabilities of the computing device 210 such as by beaconing (e.g., sending a beacon packet with the capabilities) using a packet targeted toward a multicast group or by transmitting a packet to a directory service (such as the directory service 135 of FIG. 1). A pull-based discovery service 226 can advertise the capabilities of the computing device 210 by responding to a query of the discovery service 226. Suitable protocols for implementing the discovery service 226 can include the discovery and launch (DiAL) protocol and/or the universal plug and play (UPnP) protocol. By using the discovery service 226, remote devices and/or services can determine the capabilities of the computing device 210 prior to issuing commands to the computing device 210.

The remote launch service 228 can include different software routines, modules, or components for enabling applications of the computing device 210 to be launched from a remote device or service. For example, the remote launch service 228 can receive a remote launch command encoded within a network packet addressed to the remote launch service 228 of the computing device 210. The remote launch service 228 can decode packets addressed to it, and can signal to the operating system kernel 222 when a remote launch command is detected. The remote launch command can specify the particular program to launch. As a specific example, the remote launch command can specify that the peer receiver application is to be launched. The operating system kernel 222 can perform security checks to determine whether the peer receiver application can be launched, and the operating system kernel 222 can load and start the application.

The computing device 230 can be configured as a transmitting device. The computing device 230 can include one or more processors 232, one or more network interface controllers (NICs) 236, and memory 240. The processor(s) 232 can execute instructions that are loaded in the memory 240 and can communicate with the NIC(s) 236. The processors(s) 232, the NIC(s) 236, the memory 240, and the OS Kernel 242 can operate similarly as the processors(s) 212, the NIC(s) 216, the memory 220, and the OS Kernel 222, respectively, described above. Software can be used to configure the computing device 230 as a transmitting device. For example, the memory 240 can be loaded with an operating system kernel 242, a peer transmitter application 244, and a connection data structure 246. In one embodiment, the peer transmitter application 244 and the connection data structure 246 can be integrated into an operating system of the computing device 230.

The peer transmitter application 244 can include different software routines, modules, or components for managing a peer-to-peer connection with a receiver application on a different computing device, such as the peer receiver application 224 of the computing device 210. For example, the peer transmitter application 244 can generate packets for transmission over the communication channels 250 and 260 and can communicate the packets to the NIC(s) 236 either directly or by using the operating system kernel 242; and the peer transmitter application 244 can receive packets from the NIC(s) 216 that are transmitted over the communication channels 250 and 260. The packets generated by the peer transmitter application 244 can be encoded to advertise the transmitter's capabilities during a peer-to-peer communication session (such as during discovery) and to maintain a peer-to-peer communication session. Packets transmitted by the peer transmitter application 244 over the channel 250 can be encoded to represent an image and/or sound that can be displayed or output on an output device (such as a display monitor and/or speaker) of a remote computing device (such as the computing device 210). As a specific example, the peer transmitter application 244 can be a Miracast transmitter application that can be used to project a screen of the computing device 230 on a screen of a remote computing device (such as the computing device 210). The peer transmitter application 244 can cause a stream of packets to be sent to the remote computing device to support video and/or audio streaming on a remote device. Additionally, probe request and/or response packets can be received and processed by the peer transmitter application 244 during discovery in accordance with the discovery protocol. The peer transmitter application 244 can generate probe request and/or response packets in response to received packets during discovery.

The peer transmitter application 244 can select a remote computing device with which to form a peer-to-peer connection. As a specific example, the peer transmitter application 244 can receive a beacon packet from a peer receiver application that advertises the presence and capabilities of a remote device capable of forming a peer-to-peer connection. Multiple remote devices may be beaconing and so the peer transmitter application 244 can select one of the remote devices from the group. As one example, the peer transmitter application 244 can present a user interface to a user of the computing device 230 so that the user can select the particular remote device to connect to. Additionally, the peer transmitter application 244 can detect that no remote devices capable of forming a peer-to-peer connection are beaconing or responding to probe request packets. In this case, there may be remote devices capable of forming a peer-to-peer connection within physical proximity of the computing device 230, but the remote devices may be in a low-power state or they may not be currently executing a peer receiver application. The peer transmitter application 244 can search for these remote devices using one or more of the methods described below.

As one example, the computing device 230 can include the connection data structure 246. The connection data structure 246 can include a table or other database that caches remote computing devices capable of forming a peer-to-peer connection that have been connected to at an earlier point in time. An entry of the connection data structure 246 can include an identifier of the remote device, one or more network identifiers associated with the remote device, and one or more addresses associated with the remote device. As a specific example, the connection data structure 246 can include an entry for the computing device 210. The entry can include a device identifier associated with the computing device 210, a network identifier (such as a service set identifier (SSID)) for the second channel 260, and an address (such as a MAC address) of the computing device 210 using the first channel 250. When the channel 260 is active and the channel 250 is inactive, the peer transmitter application 244 can detect the channel 260 is active by receiving a beacon frame from the channel 260, or by receiving a probe response to a probe request over the channel 260. The connection data structure 246 can be searched, using the network identifier of the channel 260, to determine if any remote devices capable of forming a peer-to-peer connection have recently been connected to the channel 260. In this manner, identifiers associated with active channels of the computing device 230 can be used as keys for searching the connection data structure 246 to find sleeping or inactive remote computing devices capable of forming a peer-to-peer connection with the computing device 230.

As another example, the peer transmitter application 244 can send a discovery request to a discovery service executing on a remote computing device (e.g., the computing device 210) to determine whether there may be any remote computing devices capable of forming a peer-to-peer connection with the computing device 230. Querying the remote computing devices capable of forming peer-to-peer connections can be limited to those devices that are and a power state that can process the discovery request. However, querying a remote computing device that stores a directory (such as the directory service 135 of FIG. 1) of computing devices capable of forming peer-to-peer connections can potentially identify sleeping computing devices.

When a remote computing device capable of forming a peer-to-peer connection with the computing device 230 as identified, the peer transmitter application 244 can determine whether the peer channel (e.g., channel 250) to the remote computing device is active or inactive. If the peer channel is inactive, the peer transmitter application 244 can determine whether the remote computing device is awake or asleep. As one example, the peer transmitter application 244 can ping the remote computing device over the channel 260 and wait for a response. If a response arrives before a time-out period, the remote computing device is awake. If the remote computing device is asleep, the peer transmitter application 244 can cause at least one magic packet to be transmitted to the remote computing device over the channel 260 to wake the remote computing device. The peer transmitter application 244 can wait for the remote device to transition to a higher power state. For example, the peer transmitter application 244 can wait a few to tens of seconds for the remote device to transition to the higher power state. When the remote computing device is awake, and if a beacon over the channel 250 is not detected (or a probe response to a probe request is not detected), the peer transmitter application 244 can cause a remote launch command to be sent to a remote launch service to activate a peer receiver application so that a peer communication channel can be formed.

It should be noted that a particular computing device can include software for both the receiving and transmitting functions for peer-to-peer communications. For example, the receiving and transmitting functions can both be integrated into an operating system of the particular computing device, and the particular function (e.g., receiving or transmitting) used by the computing device can be selected at runtime. As a specific example, a computing device can include a peer receiver application, a peer transmitter application, a discovery service, a remote launch service, and a connection data structure.

Figure 3:
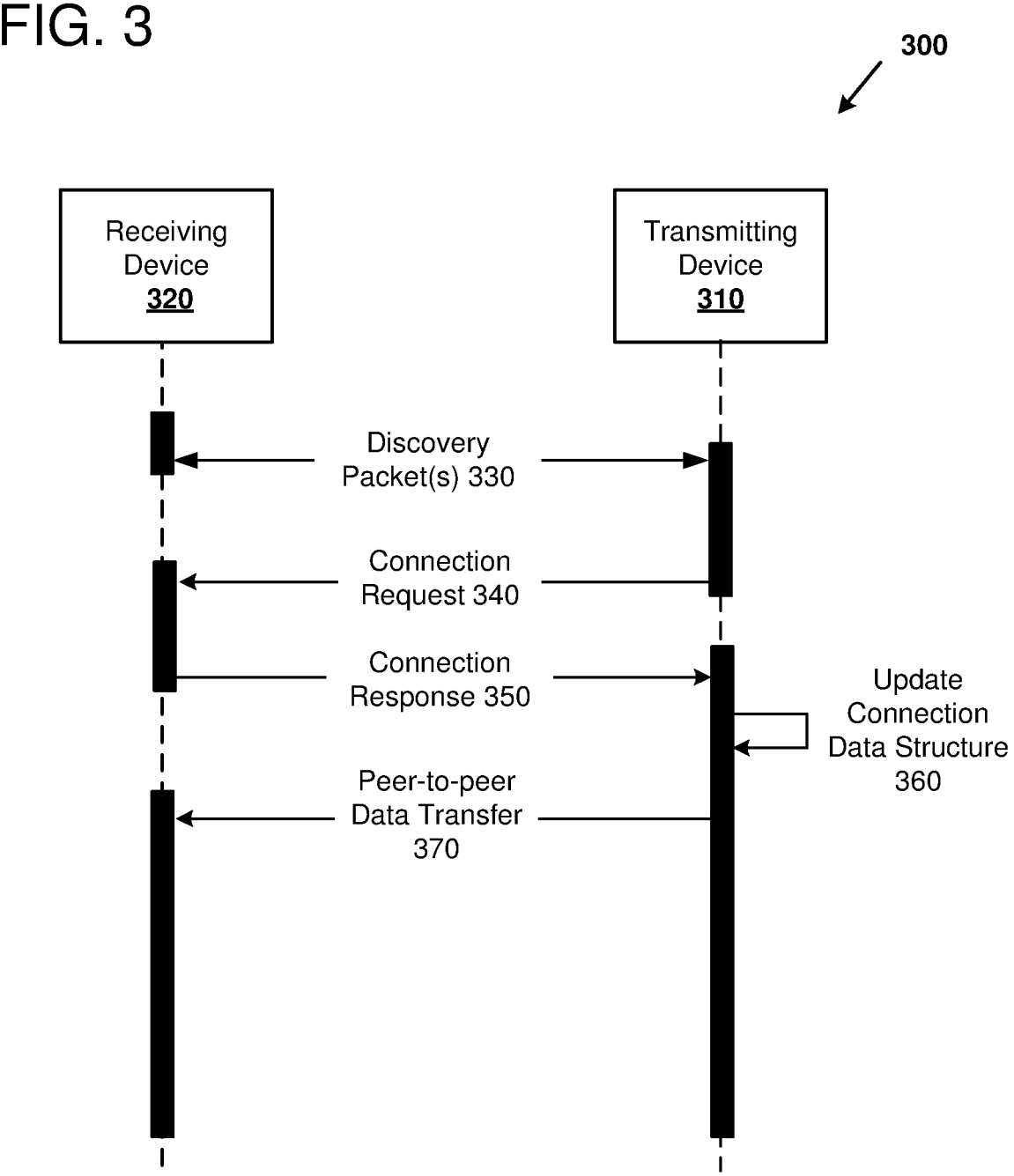
FIG. 3 shows a sequence diagram of an example method of initiating a peer communication channel and transferring data over the peer communication channel.

FIG. 3 shows a sequence diagram of an example method 300 of initiating a peer communication channel and transferring data over the peer communication channel Specifically, a transmitting device 310 requests a peer-to-peer connection with a receiving device 320 and, after a peer-to-peer connection is formed, transfers data to the receiving device 320 using the peer-to-peer connection. In this example, the receiving device 320 is awake and the peer receiver application is executing on the receiving device 320. The receiving device 320 advertises that it is capable of forming a peer-to-peer connection using a beacon frame. At 330, discovery packets are communicated between the transmitting device 310 and the receiving device 320 so that the characteristics of the peer communication channel can be negotiated. As a specific example, a beacon frame can be transmitted from the receiving device 320 to any devices (e.g., the transmitting device 310) within range of the beacon frame. For example, the beacon frame can be transmitted over Wi-Fi and any devices within the range of the Wi-Fi transmitter can receive the beacon frame. The transmitting device 310, using information decoded from the beacon frame, can transmit a connection request at 340 to the receiving device 320. The receiving device 320 can respond to the connection request by sending a connection response at 352 form a peer-to-peer connection with the transmitting device 310. At 360, the transmitting device 310 can update a connection data structure using information encoded within the connection response and/or the beacon frame. For example, the connection response can include an information element comprising a device identifier, a MAC address of the receiving device 320 over an infrastructure channel, or other information that can be used to wake or remotely launch the peer receiver application at a later time. At 370, after the peer-to-peer connection is formed, the transmitting device 310 can begin transmitting a peer-to-peer data transfer to the receiving device 320.

Figure 4:
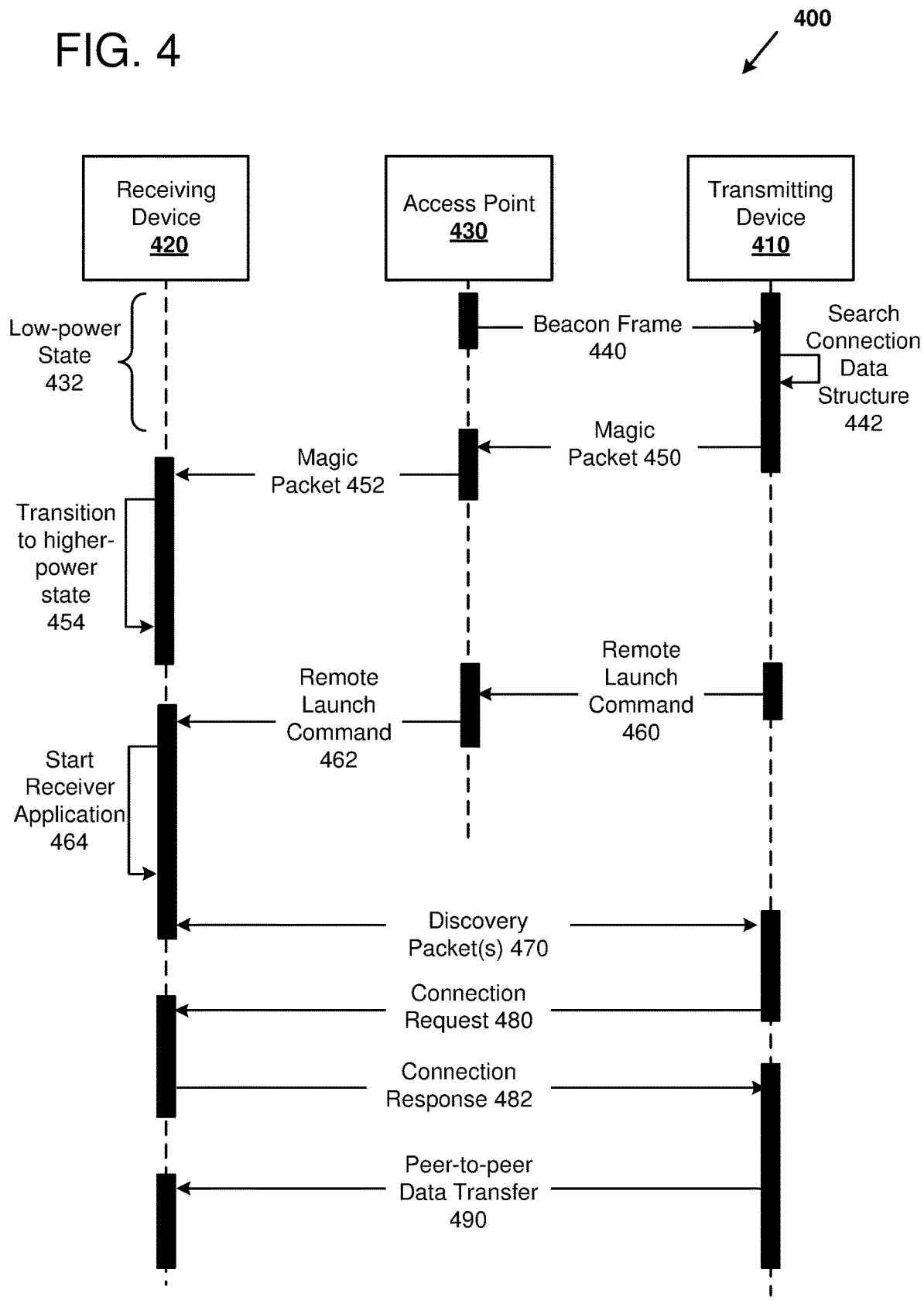
FIG. 4 shows a sequence diagram of an example method of initiating a peer communication channel when a receiving device is in a low-power mode.

FIG. 4 shows a sequence diagram of an example method 400 of initiating a peer communication channel when a receiving device 420 is in a low-power mode. In this example, a transmitting device 410 and the receiving device 420 are connected to an infrastructure communication channel via an access point 430. At 432, the receiving device 420 is in a low-power state to conserve energy. However, the receiving device 420 continues to monitor packets arriving over the infrastructure communication channel. For example, the receiving device 420 can perform some processing of the received packets and can identify magic packets address to the receiving device 420. At 440, the access point 430 can advertise the presence, characteristics, and capabilities of the infrastructure communication channel using a beacon frame. For example, the beacon frame can include a field indicating the beacon frame is for an infrastructure network and an SSID field associated with the infrastructure communication channel. At 442, the SSID field can be used as a key to search a connection data structure. For example, the connection data structure can store identifiers of receiving devices that have been recently used to form peer-to-peer communication channels with the transmitting device 410 and have been attached to the infrastructure communication channel associated with the SSID field. After searching the connection data structure, an address (e.g., a MAC address) of the receiving device 420 over the infrastructure communication channel can be identified. The address of the receiving device 420 can be encoded in a magic packet that is transmitted, at 450, from the transmitting device 410 over the infrastructure communication channel to the access point 430. At 452, the magic packet can be forwarded from the access point 430 over the infrastructure communication channel to the receiving device 420. At 454, the receiving device 420 can decode the magic packet and transition to a higher power state. In this example, when the receiving device 420 transitions to the higher power state, the peer receiver application is not executing. In other examples, the peer receiver application can begin execution when the receiving device 420 transitions to the higher power state. The transmitting device 410 can wait for a period of time so that the receiving device 420 can transition to the higher power state. At 460, after waiting for the transition, the transmitting device 410 can transmit a remote launch command addressed to the receiving device 420 over the infrastructure communication channel via the access point 430. The remote launch command can specify that the peer receiver application is to be launched. At 462, the remote launch command can be forwarded from the access point 430 to the receiving device 420. At 464, in response to receiving the remote launch command, the peer receiver application can start on the receiving device 420. At 470, discovery packets can be communicated between the transmitting device 410 and the receiving device 420 so that the characteristics of the peer communication channel can be negotiated. As a specific example, a beacon frame advertising the peer communication channel can be transmitted from the receiving device 420. For example, the beacon frame can include a field indicating that the beacon frame is for a peer communication channel. The transmitting device 410 can receive the beacon frame and can transmit a connection request at 480 in response to receiving the beacon frame. The receiving device 420 can receive the connection request and can respond with a connection response at 482 to form a peer-to-peer communication channel between the receiving device 420 and the transmitting device 410. After the peer-to-peer communication channel is formed, the transmitting device 410 can begin transferring data over the peer-to-peer communication channel at 490.

FIG. 5A illustrates examples of a magic packet 520 and a response packet 500 including an information element in a payload 510 of the response packet 500. The response packet 500 can be a link layer packet sent in response to a request to form a peer-to-peer communication channel. The response packet 500 can include various different fields, such as a destination address (DA) 502, a source address (SA) 504, a frame type (FT) 506, and a payload 510. The response packet 500 can also include additional fields, such as a preamble, a start frame the limiter, and the frame check sequence (not shown). The source address 504 can indicate the source device of the response packet 500. For example, the source address 504 can include a MAC address (associated with an infrastructure communication channel) of a receiving device. The destination address 502 can indicate the destination device of the response packet 500. For example, the destination address 502 can include a MAC address (associated with an infrastructure communication channel) of a transmitting device. The frame type 506 can be selected to indicate that the frame is a response frame. The payload field 510 can include an information element with one or more subfields that can be used to uniquely identify the source device of the response packet and/or to identify capabilities of the source device.

As one example, the subfields can include a device identifier (Device ID) 512, a MAC address 514 of the source device over an infrastructure communication channel, a MAC address of an access point (APMAC) 516 connected to the source device, a directory address (DAD) 518, and a capability field 519. The device identifier 512 can be a unique number that is constant for a device regardless of a communication channel that is used to access the device. Thus, the device identifier 512 is different from a MAC address that is assigned to a particular communication channel. The directory address 518 can be an address (e.g., an Internet protocol (IP) address) for accessing a directory service (such as the directory service 135 of FIG. 1) that stores capabilities of the device. The capability field 519 can indicate one or more capabilities of the device. For example, the capability field 519 can be encoded to indicate whether the device supports magic packets, whether the device supports remote launching of applications, and so forth.

The magic packet 520 can be a link layer packet used to transition a particular device from a lower power state to a higher power state. The magic packet 520 can include various different fields, such as a destination address (DA) 522, a source address (SA) 524, a frame type (FT) 526, and a payload 530. The magic packet 520 can also include additional fields, such as a preamble, a start frame the limiter, and the frame check sequence (not shown). The destination address 522 is encoded to indicate the magic packet 520 is a broadcast packet. For example, the destination address 522 can be encoded with six octets of hexadecimal FF to indicate the magic packet 520 as a broadcast packet. The payload 530 can include a magic packet string (FFx6) comprising six octets of hexadecimal FF followed by a string (MACx16) 534 comprising 16 repetitions of the MAC address of the device.

FIG. 5B illustrates an example of a connection data structure 540. As illustrated, the connection data structure 540 can include n entries where each entry includes multiple fields. Each of the entries can correspond to a unique device identifier representing a peer device that has formed a peer-to-peer communication connection with the device associated with the connection data structure 540. For example, the n entries can correspond to the peer devices that were most recently used to form peer communication channels. As another example, the n entries can correspond to the peer devices that were most frequently used to form peer communication channels.

Each entry can include various different fields. For example, an entry can include a device identifier (Device ID) 542, a first service set identifier (SSID1) 544 corresponding to an infrastructure communication channel, a first address (MAC1) corresponding to the infrastructure communication channel, a second service set identifier (SSID2) 548 corresponding to the peer communication channel, a second address (MAC2) 550 corresponding to the peer communication channel, and a capabilities field 552. It should be noted that SSID1 544 and SSID2 548 can be the same when the infrastructure communication channel and the peer communication channel are multiplexed over a common set of signals. Additionally, the second address 550 can be different each time that it peer communication channel is formed with the device. For example, the second address 550 can be assigned by an operating system each time that a peer receiver application is started. The capabilities field 552 can indicate whether the particular device associated with the device identifier 542 supports magic packets, remote launching, remote launching under lock, and so forth.

Example Methods

Figure 6A:
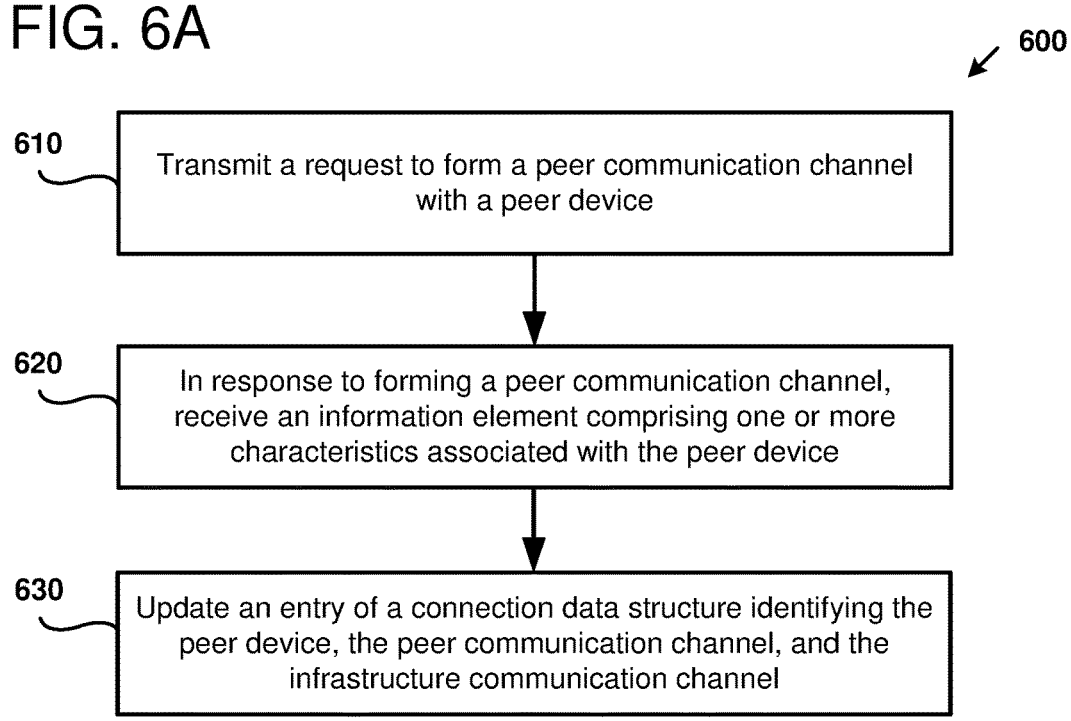
FIG. 6A illustrates a flow diagram of an example of initiating a peer communication channel when a peer device is detected and updating the connection data structure.

FIG. 6A illustrates an example method 600 of initiating a peer communication channel when a peer device is detected and updating the connection data structure. For example, the method 600 can be performed by a transmitting device (such as any of the transmitting devices 120, 230, 310, and 410 of FIGS. 1-4, respectively).

At 610, a request can be transmitted to form a peer communication channel with the peer device. The request can be transmitted in response to performing a discovery sequence. For example, the request can be transmitted in response to receiving a beacon frame from the peer device. The beacon frame can include an address of the peer device over the peer communication channel so that the request can be transmitted directly to the peer device.

At 620, in response to forming a peer communication channel, an information element can be received. For example, the information element can be sent in a payload of a response packet. The information element can include one or more characteristics associated with the peer device. For example, the information element can include a device identifier of the peer device, a MAC address of the peer device over an infrastructure communication channel, and/ or capabilities of the peer device.

At 630, an entry of a connection data structure can be updated. The entry can identify the peer device, the peer communication channel, and the infrastructure communication channel using the information extracted from the received information element. The connection data structure can be searched at a later time to determine if there may be peer devices capable of forming a peer-to-peer connection in proximity to the transmitting device even though the peer device is not detected, such as when the peer device is in a low-power state.

Figure 6B:
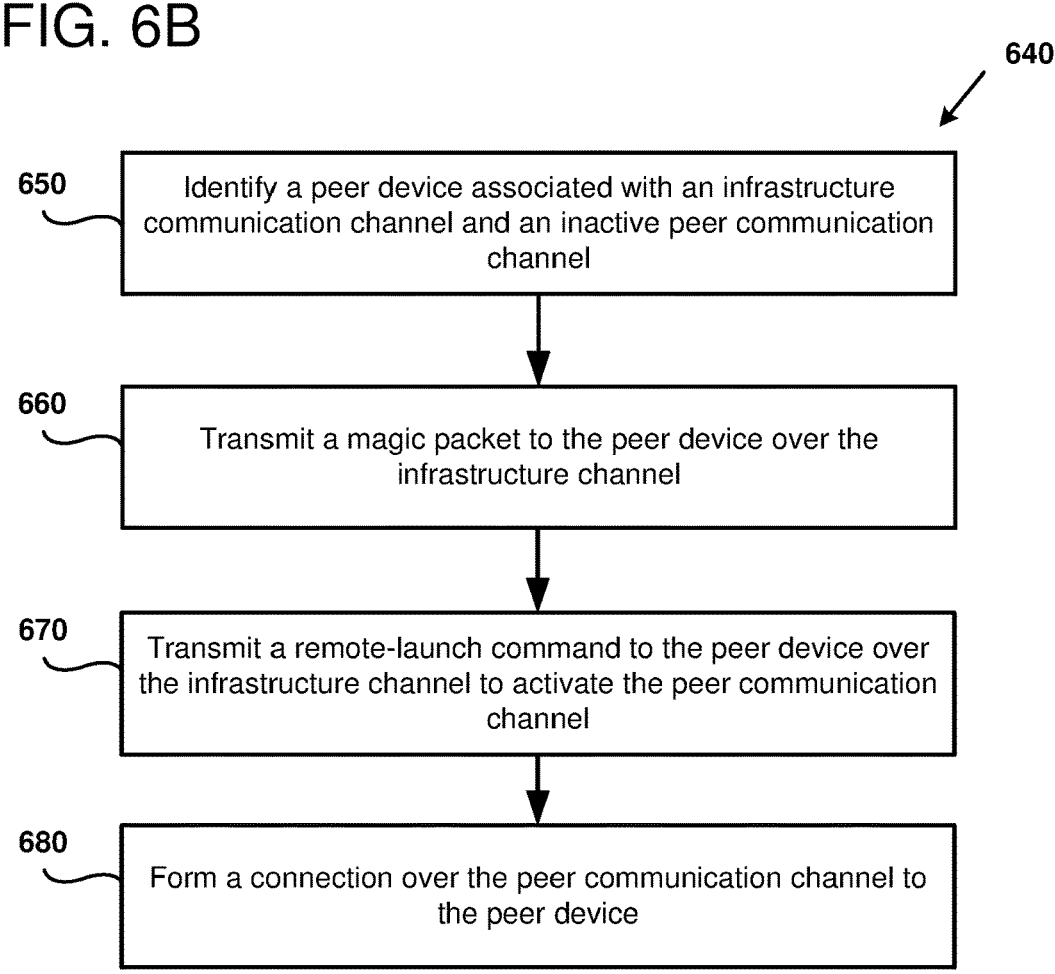
FIG. 6B illustrates a flow diagram of an example of initiating a peer communication channel when a peer device is not detected.

FIG. 6B illustrates an example method 640 of initiating a peer communication channel when a peer device is not detected. For example, the method 640 can be performed by a transmitting device (such as any of the transmitting devices 120, 230, 310, and 410 of FIGS. 1-4, respectively).

At 650, a peer device can be identified. For example, the peer device can be identified by searching for candidate peer devices within a connection data structure. The peer device can be associated with an infrastructure communication channel and an inactive peer communication channel Thus, information about the infrastructure communication channel can be used as a key when searching the connection data structure. In particular, an SSID of the infrastructure communication channel can be used as a key when searching the connection data structure. A successful search of the connection data structure can return one or more candidate peer devices that are connected to the infrastructure communication channel and the addresses of the candidate peer devices over the infrastructure communication channel From the one or more candidate peer devices, a single peer device can be selected with which to form a peer communication channel.

At 660, a magic packet can be transmitted to the peer device over the infrastructure communication channel. The magic packet can include the address of the peer device retrieved from the connection data structure. Specifically, the magic packet can be a broadcast packet having a payload containing a magic packet string (e.g., a string of six octets of hexadecimal FF) and a link layer or MAC address of the peer device replicated 16 times, where the MAC address is the MAC address over the infrastructure communication channel. It should be noted that an address assigned to the peer device during an earlier peer-to-peer connection is not used for the magic packet because the former peer address may be invalid even when connecting to the same peer device. The connection data structure provides the information for the magic packet by associating the peer device with an address associated with the infrastructure communication channel. When the magic packet is received at the peer device, the peer device can transition to a higher power state. The transition can take several seconds, and so the transmitting device can wait before continuing at 670.

At 670, a remote launch command can be transmitted to the peer device over the infrastructure channel to activate the peer communication channel. For example, the remote launch command can cause a peer receiver application to be started on the peer device so that the peer device can participate in discovery (e.g., transmit a beacon packet for the peer communication channel). Starting the peer receiver application can also cause an address to be assigned to the peer device for the peer communication channel. The beacon packet can include the newly assigned address within a payload of the beacon packet.

At 680, a connection can be formed with the peer device over the peer communication channel. For example, the connection can be formed using a negotiated handshake between the peer device and the transmitting device. The handshake can include sending a connection request from the transmitting device to the peer device and receiving a response at the transmitting device. When the peer-to-peer communication channel is formed, the transmitting device can send information directly to the peer device over the peer-to-peer communication channel.

Figure 7A:
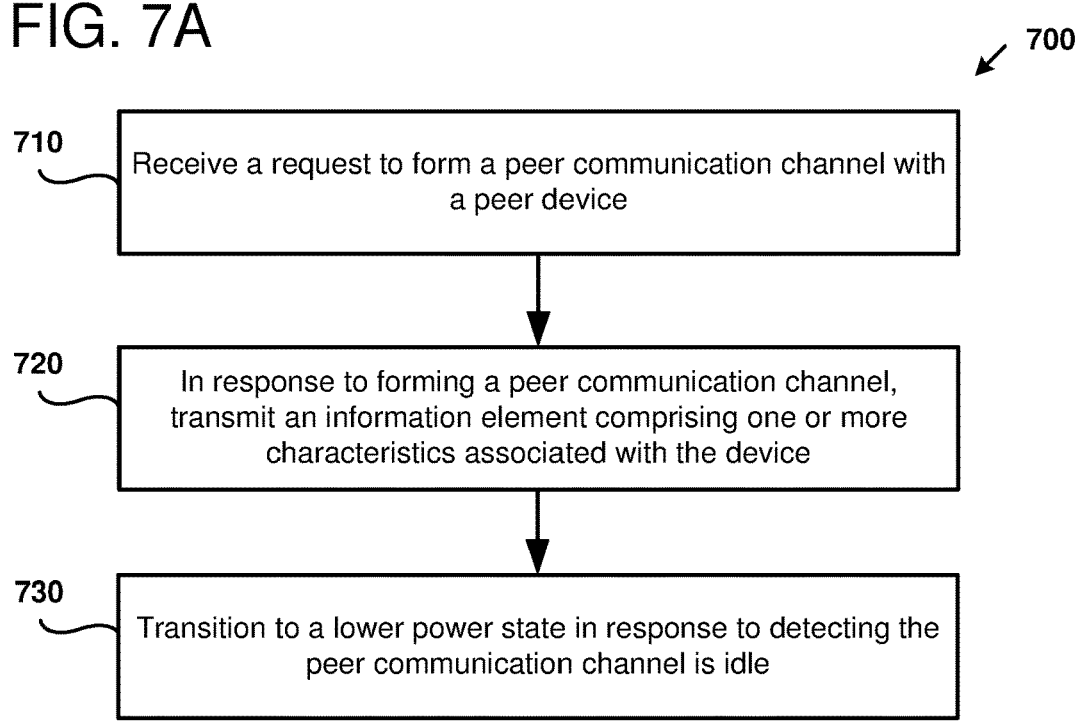
FIG. 7A illustrates a flow diagram of an example of responding to a request to initiate a peer communication channel when a peer receiver application is active.

FIG. 7A illustrates an example method 700 of responding to a request to initiate a peer communication channel when a peer receiver application is active. For example, the method 700 can be performed by a receiving device (such as any of the receiving devices 110, 210, 320, and 420 of FIGS. 1-4, respectively).

At 710, a request can be received to form a peer communication channel with the peer device. The request can be received in response to performing discovery (e.g., transmitting a beacon frame to the peer device. The beacon frame can include an address of the receiving device over the peer communication channel so that the request can be transmitted directly to the receiving device.

At 720, an information element can be transmitted in response to forming the peer communication channel. For example, the information element can be sent in a payload of a response packet. The information element can include one or more characteristics associated with the receiving device. For example, the information element can include a device identifier of the receiving device, a MAC address of the receiving device over an infrastructure communication channel, and/or capabilities of the receiving device.

At 730, the receiving device can transition from a higher power state to a lower power state. As one example, the transition can occur in response to detecting that the peer communication channel is idle. Transitioning to the lower power state can include terminating or suspending the peer receiver application; suspending the transmission of beacon frames advertising the peer communication channel; powering down one or more hardware components of the receiving device; gating clocks to a component of the receiving device; reducing a frequency of a clock of a component; and/or reducing a voltage applied to a component. Some components of the receiving device can remain operational during the lower power state. For example, a NIC of the receiving device can remain at least partially active so that magic packets can be decoded when they are received by the NIC over an infrastructure communication channel.

Figure 7B:
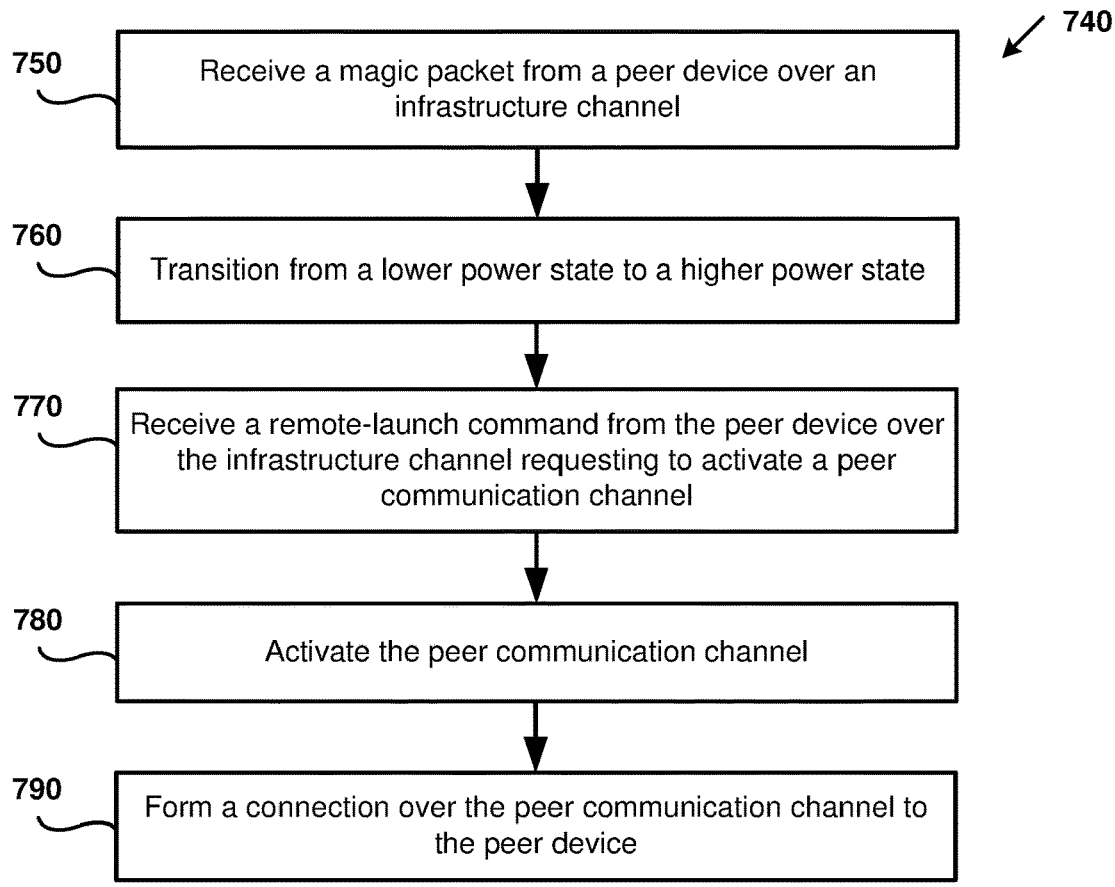
FIG. 7B illustrates a flow diagram of an example of initiating and forming a peer communication channel when one of the peer devices is initially in a low-power state.

FIG. 7B illustrates an example method 740 of initiating and forming a peer communication channel when one of the peer devices is initially in a low-power state. For example, the method 740 can be performed by a receiving device (such as any of the receiving devices 110, 210, 320, and 420 of FIGS. 1-4, respectively).

At 750, a magic packet can be received from the peer device over the infrastructure communication channel. The magic packet can include an address of the receiving device. Specifically, the magic packet can be a broadcast packet having a payload containing a magic packet string (e.g., a string of six octets of hexadecimal FF) and a link layer or MAC address of the receiving device replicated 16 times. The magic packet can be detected and decoded as matching an address of the receiving device.

At 760, in response to detecting a magic packet, the receiving device can transition from a lower power state to a higher power state. Transitioning to the higher power state can include starting or unsuspending a peer receiver application; beginning the transmission of beacon frames advertising the peer communication channel; powering up one or more hardware components of the receiving device; restarting clocks to a component of the receiving device; increasing a frequency of a clock of a component; and/or increasing a voltage applied to a component. In one embodiment, transitioning to the higher power state does not include starting the peer receiver application and does not include beginning the transmission of beacon frames advertising the peer communication channel. However, an explicit command to start the peer receiver application, either from the receiving device or from a remote launch command (e.g., at 770), can be used to start the peer receiver application and begin the transmission of beacon frames advertising the peer communication channel.

At 770, a remote launch command can be received from the peer device over the infrastructure channel requesting to activate the peer communication channel. The request can include various parameters encoded in fields of the request, such as parameters specifying the command to be launched, user credentials, and so forth. The parameters of the request can be compared to capabilities, states, and settings of the receiving device to determine whether the remote launch command will be executed. For example, one or more states of the receiving device can be determined, such as whether the receiving device is under lock. The settings can determine whether particular programs can be launched under lock by users other than a user that locked the receiving device. If the user issuing the remote launch command has authorization (e.g., the requesting user is the user that locked the receiving device, or the user has permission to issue the command under lock) to launch the peer receiver application then the peer receiver application can be started. Thus, the peer receiver application can be started (and the peer communication channel can be activated) under lock or over lock. On the other hand, if the user does not have permission to perform the action specified by the remote launch command then the action can be blocked. In some embodiments, the remote launch command may not specify a user and so the remote launch command will be executed based on states, settings, and capabilities that are user-independent. In some embodiments, the receiving device can prompt the user to request whether to activate the peer communication channel.

At 780, the peer communication channel can be activated. For example, the peer communication channel can be activated in response to the remote launch command being executed, where the remote launch command specifies that the peer receiver application is to be started. Starting the peer receiver application can enable the peer receiver to participate in discovery. For example, starting the peer receiver application can initiate transmission of the beacon packet that advertises the peer communication channel, thus activating the peer communication channel Additionally or alternatively, starting the peer receiver application can start a process to capture and process any probe request packets that are received. Starting the peer receiver application can cause an address to be assigned to the interface of the receiving device associated with the peer communication channel. The address can be different each time the peer receiver application is started. Thus, a magic packet sent to the address associated with the peer communication channel cannot be used to cause the receiving device to transition to a higher power state. The address assigned to the interface of receiving device associated with the peer communication channel can be transmitted and a payload of the beacon packet.

At 790, a connection can be formed with the peer device over the peer communication channel. For example, the connection can be formed using a negotiated handshake between the peer device and the receiving device. The handshake can include receiving a connection request from the peer device to the receiving device and transmitting a response to the peer device. When the peer-to-peer communication channel is formed, the receiving device can receive information directly from the peer device over the peer-to-peer communication channel.

Figure 8:
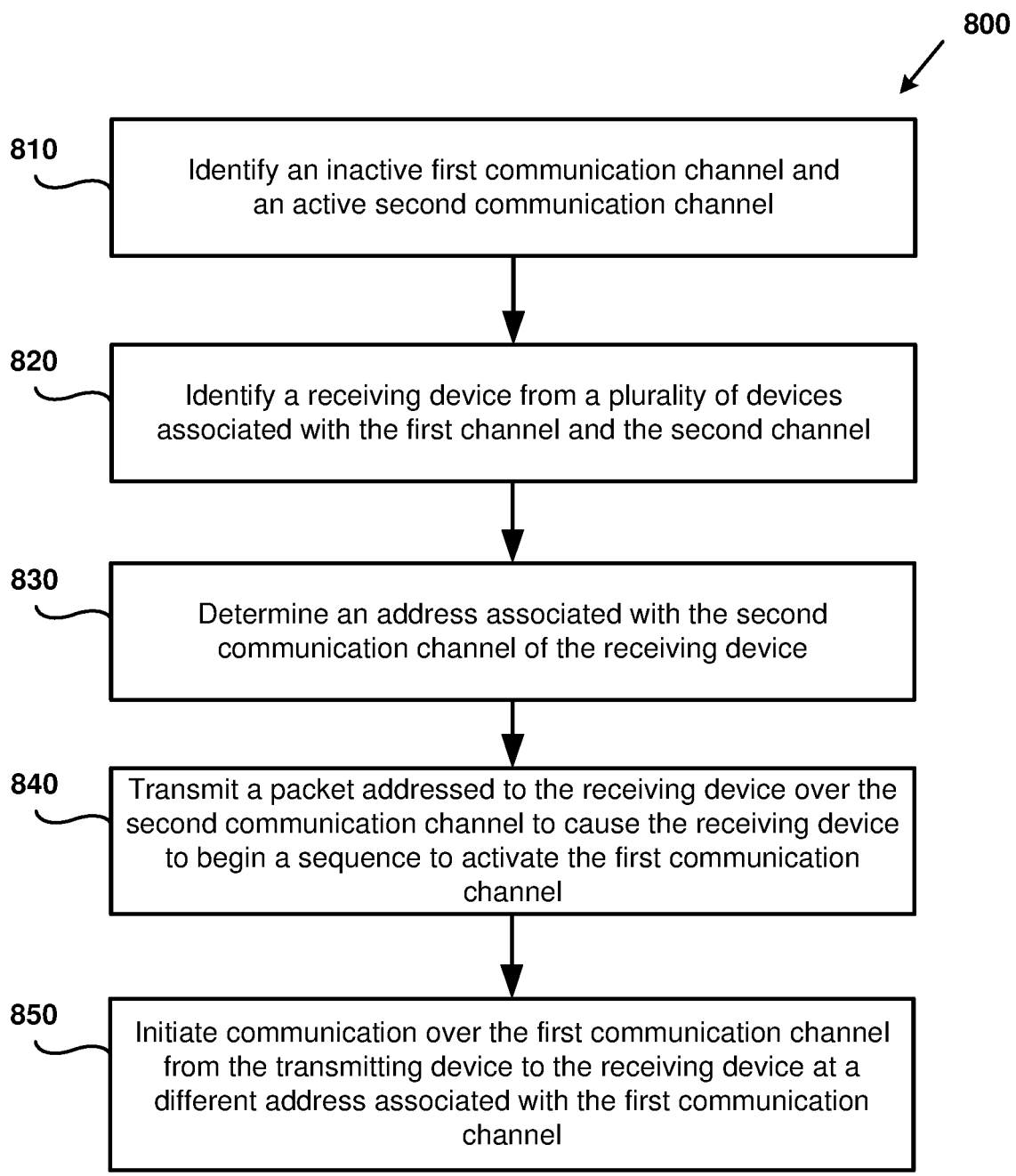
FIG. 8 illustrates a flow diagram of an example method of initiating peer-to-peer communications between a transmitting device and a receiving device over an inactive first communication channel.

FIG. 8 illustrates an example method 800 of initiating peer-to-peer communications between a transmitting device and a receiving device over an inactive first communication channel. For example, the method 800 can be performed by a transmitting device (such as any of the transmitting devices 120, 230, 310, and 410 of FIGS. 1-4, respectively).

At 810, an inactive first communication channel and an active second communication channel can be selected. As specific examples, the inactive first communication channel can use the Wi-Fi Direct and/or the Miracast communication protocols and the active second communication channel can use the infrastructure Wi-Fi, Ethernet, or Bluetooth communication protocols. The active second communication channel is a channel that is enabled on the transmitting device and can be used by the transmitting device to send network packets. The inactive first communication channel is a channel that is not currently enabled on the transmitting device. The inactive first communication channel can be selected by searching a connection data structure or other database to find entries having a communication channel that matches the enabled communication channels of the receiving device. As a specific example, the receiving device can be connected to a Wi-Fi network having a particular SSID. The connection data structure can be searched to find all entries that have a field matching the particular SSID. Each of the entries can include a device identifier and a pair of communication channels, where one of the communication channels is an infrastructure channel and one of the channels is a peer channel. The Wi-Fi network having the particular SSID can be the active second communication channel and the inactive first communication channel can be selected from any of the peer channels specified within the matching entries.

At 820, a receiving device can be selected from a plurality of devices associated with the first channel and the second channel Continuing with the example above, the receiving device can be selected from any of the entries containing both the inactive first communication channel and the active second communication channel. The receiving device can be specified by the device identifier of the selected entry. The connection data structure can include entries corresponding to the most recently used or the most frequently used peer-to-peer communication channels, and so the selected receiving device can be selected from the most recently used or the most frequently used receiving devices.

At 830, an address associated with the second communication channel of the receiving device can be determined. For example, the address can be specified in an entry of the connection data structure. The address can be a link layer address, such as a MAC address.

At 840, a packet addressed to the receiving device over the second communication channel can be transmitted to the receiving device and the packet can cause the receiving device to begin a sequence to activate the first communication channel. As one example, the packet can be a magic packet including a magic packet string and a string including the address that is repeated multiple times. As another example, the packet can be a remote launch command specifying that a peer receiver application is to be launched. The sequence to activate the first communication channel can include: transitioning the receiving device from a lower power state to a higher power state; starting a peer receiver application; transmitting a beacon frame advertising the second communication channel; sending a request to form a peer-to-peer connection from the transmitting device to the receiving device; and/or sending a response acknowledging that a peer-to-peer connection is formed from the receiving device to the transmitting device.

At 850, communication over the first communication channel can be initiated from the transmitting device to the receiving device at a different address associated with the first communication channel. For example, the different address can be assigned to the receiving device when the second communication channel is activated and the different address can be advertised in a beacon frame transmitted from the receiving device. In contrast, the address associated with the second communication channel of the receiving device can be constant. For example, the address associated with the second communication channel can be a MAC address that is specified during manufacture of the receiving device. Thus, the transmitting device can cause the inactive first communication channel to be activated by sending a packet to the receiving device that is addressed to an address over the second communication channel that is different than the address that will be used to send packets to the receiving device over the first communication channel.

Additional Examples of the Disclosed Technology

Additional examples of the disclosed subject matter are discussed herein in accordance with the examples discussed above.

In one embodiment, a computing system includes a network interface controller configured to communicate over an infrastructure communication channel, and a processor in communication with the network interface controller. The processor is configured to identify a peer device that is addressable over the infrastructure communication channel and is associated with an inactive peer-to-peer communication channel. The processor is configured to use the network interface controller to transmit a network packet over the infrastructure communication channel to the peer device causing an activation sequence of the inactive peer-to-peer communication channel to be initiated.

The network packet can be a magic packet comprising a media access control address of the peer device over the infrastructure channel. The activation sequence can include transitioning the peer device from a lower power state to a higher power state. The network packet can include a command to remotely launch a software application that activates the peer-to-peer communication channel associated with the peer device. The inactive peer-to-peer communication channel associated with the peer device can be a Wi-Fi Direct channel. As one example, the peer communication channel can be using the Miracast communication protocol over Wi-Fi Direct. Identifying the peer device can include searching a data structure identifying most recently used peer devices. Identifying the peer device can include identifying a device identifier associated with the infrastructure communication channel and the inactive peer-to-peer communication channel. The device identifier can be received in response to forming a connection with the peer device over the peer-to-peer communication channel. Identifying the device identifier associated with the infrastructure communication channel and the inactive peer-to-peer communication channel can include accessing a remote directory accessible over the infrastructure communication channel. An address of the peer device over the infrastructure communication channel can be received in response to forming a connection with the peer device over the peer-to-peer communication channel.

In another embodiment, a method can be used to initiate peer-to-peer communications between a transmitting device and a receiving device over an inactive first communication channel. The method includes: determining an address associated with a second communication channel of the receiving device; transmitting a packet addressed to the receiving device over the second communication channel to cause the receiving device to begin a sequence to activate the first communication channel; and initiating communication over the first communication channel from the transmitting device to the receiving device at a different address associated with the first communication channel.

The first communication channel can be a Miracast channel and the second communication channel can be an infrastructure IEEE 802.11 channel. The transmitted packet can include a command to a remote launch service executing on the receiving device. The address associated with the second communication channel can be a media access control address of the receiving device. The transmitted packet can be a magic packet comprising the media access control address of the receiving device, and the magic packet is configured to wake the receiving device. Determining the address associated with the second communication channel of the receiving device can include caching a device identifier associated with the receiving device when the first communication channel is active. The device identifier associated with the receiving device can be received in response to a request to form a peer-to-peer connection between the transmitting device and the receiving device. Initiating communication over the first communication channel from the transmitting device to the receiving device comprises sending a packet addressed to the different address over the first communication channel.

In another embodiment, one or more computer-readable media can be used for storing computer-executable instructions, which when executed by a computer, cause the computer to perform operations. The operations include determining an address associated with a second communication channel of a receiving device; transmitting a packet addressed to the receiving device over the second communication channel to cause the receiving device to begin a sequence to activate a first communication channel; and initiating communication over the first communication channel from the transmitting device to the receiving device at a different address associated with the first communication channel.

In another embodiment, a method can be used to initiate peer-to-peer communications between a transmitting device and a receiving device. The method includes, at the receiving device, receiving a remote-launch command from the transmitting device to activate a peer-to-peer communication channel. The remote-launch command is addressed to an address of the receiving device associated with a communication channel different than the peer-to-peer communication channel. The method includes, in response to receiving the remote-launch command, enabling the receiving device to participate in a discovery protocol with the transmitting device to determine properties of the peer-to-peer communication channel. As one example, enabling the receiving device to participate in a discovery protocol with the transmitting device can include transmitting a beacon frame over the peer-to-peer communication channel, where the beacon frame advertises properties of the peer-to-peer communication channel. As another example, enabling the receiving device to participate in a discovery protocol with the transmitting device can include starting or waking a process for sending and/or receiving a probe request packet, where the probe request packet advertises properties of the peer-to-peer communication channel.

The method can further include, at the receiving device, receiving a request from the transmitting device to form a connection over a peer-to-peer communication channel. The method can further include transmitting a response to the request over the peer-to-peer communication channel. The response can include a device identifier of the receiving device that is common to the peer-to-peer communication channel and the communication channel different than the peer-to-peer communication channel. The method can further include, at the receiving device, receiving a request from the transmitting device to form a connection over a peer-to-peer communication channel. The method can further include transmitting a response to the request over the peer-to-peer communication channel. The response can include the address of the receiving device associated with the communication channel that is different than the peer-to-peer communication channel.

In another embodiment, one or more computer-readable media can be used for storing computer-executable instructions, which when executed by a computer, cause the computer to perform operations. The operations include, at a receiving device, receiving a remote-launch command from a transmitting device to activate a peer-to-peer communication channel. The remote-launch command is addressed to an address of the receiving device associated with a communication channel different than the peer-to-peer communication channel. The operations include, in response to receiving the remote-launch command, transmitting a beacon frame over the peer-to-peer communication channel. The beacon frame advertises properties of the peer-to-peer communication channel.

Example Computing Environment

Figure 9:
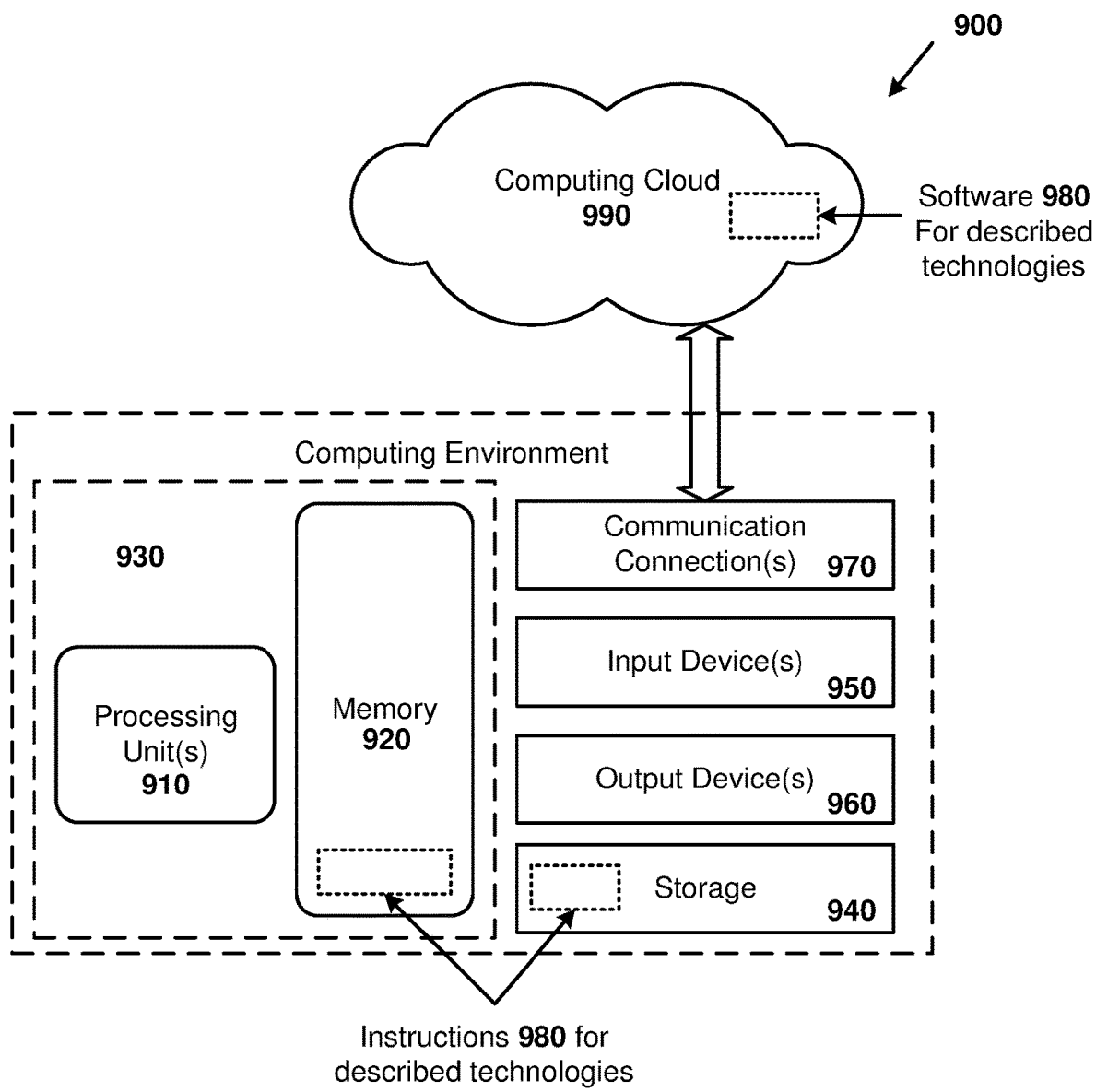
FIG. 9 is a block diagram illustrating a suitable computing environment for implementing some embodiments of the disclosed technology.

FIG. 9 illustrates a generalized example of a suitable computing environment 900 in which described embodiments, techniques, and technologies, including supporting a multi-language playback framework, can be implemented.

The computing environment 900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power and as such, multiple processors can be running simultaneously. The memory 920 may be volatile memory (e.g., registers, cache, RAM), non-volatile memory (e.g., ROM, EEPROM, flash memory, etc.), or some combination of the two. The memory 920 stores software 980, images, and video that can, for example, implement the technologies described herein. A computing environment may have additional features. For example, the computing environment 900 includes storage 940, one or more input devices 950, one or more output devices 960, and one or more communication connections 970. An interconnection mechanism (not shown) such as a bus, a controller, or a network, interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and that can be accessed within the computing environment 900. The storage 940 stores instructions for the software 980, plugin data, and messages, which can be used to implement technologies described herein.

The input device(s) 950 may be a touch input device, such as a keyboard, keypad, mouse, touch screen display, pen, or trackball, a voice input device, a scanning device, or another device, that provides input to the computing environment 900. For audio, the input device(s) 950 may be a sound card or similar device that accepts audio input in analog or digital form, or a CD-ROM reader that provides audio samples to the computing environment 900. The output device(s) 960 may be a display, printer, speaker, CD-writer, or another device that provides output from the computing environment 900.

The communication connection(s) 970 enable communication over a communication medium (e.g., a connecting network) to another computing entity. The communication medium conveys information such as computer-executable instructions, compressed graphics information, video, or other data in a modulated data signal. The communication connection(s) 970 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 990. For example, the disclosed methods can be executed on processing units 910 located in the computing environment 930, or the disclosed methods can be executed on servers located in the computing cloud 990.

Computer-readable media are any available media that can be accessed within a computing environment 900. By way of example, and not limitation, with the computing environment 900, computer-readable media include memory 920 and/or storage 940. As should be readily understood, the term computer-readable storage media includes the media for data storage such as memory 920 and storage 940, and not transmission media such as modulated data signals.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. One or more computer servers operating as part of a cloud environment, the one or more computer servers configured, via computer-executable instructions, to perform operations for initiating communications with a remote computing device over a first communication channel, the operations comprising:
   determining an address associated with a second communication channel of the remote computing device, wherein determining the address associated with the second communication channel of the remote computing device comprises obtaining a cached device identifier associated with the remote computing device, wherein the device identifier associated with the remote computing device was cached during an earlier connection over the first communication channel;
   transmitting a network packet addressed to the remote computing device over the second communication channel for causing the remote computing device to begin a sequence to activate the first communication channel; and
   initiating communication over the first communication channel with the remote computing device at a different address associated with the first communication channel.

2. The one or more computer servers of claim 1, wherein the network packet addressed to the remote computing device over the second communication channel comprises user credentials.

3. The one or more computer servers of claim 1, wherein the network packet addressed to the remote computing device over the second communication channel comprises a remote launch command for execution at the remote computing device depending on user permissions.

4. The one or more computer servers of claim 1, wherein the sequence to activate the first communication channel comprises a request to activate a peer-to-peer communication channel at the remote computing device, and wherein activation of the peer-to-peer communication channel at the remote computing device depends on user permissions.

5. The one or more computer servers of claim 1, wherein the first communication channel is a peer-to-peer communication channel and the second communication channel is an infrastructure communication channel.

6. The one or more computer servers of claim 1, wherein the first communication channel is a Miracast channel and the second communication channel is an infrastructure IEEE 802.11 channel.

7. The one or more computer servers of claim 1, wherein the transmitted packet comprises a command to a remote launch service executing on the remote computing device.

8. The one or more computer servers of claim 1, wherein the address associated with the second communication channel is a media access control address of the remote computing device.

9. The one or more computer servers of claim 8, wherein the transmitted packet is a magic packet comprising the media access control address of the remote computing device, and the magic packet is configured to wake the remote computing device.

10. The one or more computer servers of claim 1, wherein initiating communication over the first communication channel with the remote computing device comprises sending a network packet addressed to the different address over the first communication channel.

11. The one or more computer servers of claim 1, wherein the network packet is a magic packet comprising a media access control address of the remote computing device over the second communication channel, and the sequence to activate the first communication channel comprises transitioning the remote computing device from a lower power state to a higher power state.

12. The one or more computer servers of claim 1, wherein the first communication channel comprises wireless communication without using a wireless access point as an intermediary.

13. A method of initiating communications with a remote computing device over a first communication channel, the method comprising:
   determining an address associated with a second communication channel of the remote computing device, wherein determining the address associated with the second communication channel of the remote computing device comprises obtaining a cached device identifier associated with the remote computing device, wherein the device identifier associated with the remote computing device was cached during an earlier connection over the first communication channel;
   transmitting a network packet addressed to the remote computing device over the second communication channel for causing the remote computing device to begin a sequence to activate the first communication channel; and initiating communication over the first communication channel with the remote computing device at a different address associated with the first communication channel.

14. The method of claim 13, wherein the network packet addressed to the remote computing device over the second communication channel comprises user credentials.

15. The method of claim 13, wherein the network packet addressed to the remote computing device over the second communication channel comprises a remote launch command for execution at the remote computing device depending on user permissions.

16. The method of claim 13, wherein the sequence to activate the first communication channel comprises a request to activate a peer-to-peer communication channel at the remote computing device, and wherein activation of the peer-to-peer communication channel at the remote computing device depends on user permissions.

17. The method of claim 13, wherein the first communication channel is a peer-to-peer communication channel and the second communication channel is an infrastructure communication channel.

18. The method of claim 13, wherein the network packet is a magic packet comprising a media access control address of the remote computing device over the second communication channel, and the sequence to activate the first communication channel comprises transitioning the remote computing device from a lower power state to a higher power state.

19. The method of claim 13, wherein the first communication channel comprises wireless communication without using a wireless access point as an intermediary.

20. A method of initiating communications with a remote computing device over a first communication channel, the method comprising:

identifying the remote computing device that is addressable over a second communication channel, wherein the remote computing device is also associated with the first communication channel that requires activation, and wherein identifying the remote computing device comprises identifying a device identifier associated with the second communication channel and the first communication channel; and transmitting a network packet addressed to the remote computing device over the second communication channel for causing an activation sequence of the first communication channel to be initiated, wherein the device identifier is received in response to forming a connection with the remote computing device over the first communication channel.

21. The method of claim 20, wherein the network packet addressed to the remote computing device over the second communication channel comprises user credentials.

22. The method of claim 20, wherein the first communication channel comprises wireless communication directly with the remote computing device without using a wireless access point as an intermediary.

* * * * *